United States Patent
Aoai

(10) Patent No.: US 10,093,828 B2
(45) Date of Patent: Oct. 9, 2018

(54) PROCESSING FLUID FOR IMAGE FORMING BY AQUEOUS INK, IMAGE FORMING METHOD, RECORDED MATTER, AND INKJET RECORDING DEVICE

(71) Applicant: Shosuke Aoai, Shizuoka (JP)

(72) Inventor: Shosuke Aoai, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 118 days.

(21) Appl. No.: 15/094,255

(22) Filed: Apr. 8, 2016

(65) Prior Publication Data

US 2016/0312061 A1 Oct. 27, 2016

(30) Foreign Application Priority Data

Apr. 23, 2015 (JP) .................................. 2015-088038

(51) Int. Cl.

| | | |
|---|---|---|
| *B41J 11/00* | (2006.01) | |
| *B41J 2/01* | (2006.01) | |
| *C09D 179/02* | (2006.01) | |
| *C09D 179/04* | (2006.01) | |
| *C08G 73/02* | (2006.01) | |
| *B41J 2/21* | (2006.01) | |

(52) U.S. Cl.
CPC ....... *C09D 179/02* (2013.01); *C08G 73/0226* (2013.01); *B41J 2/2114* (2013.01); *B41J 2/2146* (2013.01); *B41J 11/002* (2013.01)

(58) Field of Classification Search
CPC .. C08G 73/0226; C09D 179/02; B41J 11/002; B41J 2/2114; B41J 2/2146
See application file for complete search history.

(56) References Cited

U.S. PATENT DOCUMENTS

| | | | |
|---|---|---|---|
| 2010/0003417 A1* | 1/2010 | Arai ..................... | C09D 11/322 427/385.5 |
| 2014/0253631 A1* | 9/2014 | Namba ................. | C09D 11/54 347/21 |
| 2015/0174920 A1 | 6/2015 | Namba et al. | |
| 2015/0283828 A1 | 10/2015 | Aoai et al. | |
| 2015/0367667 A1 | 12/2015 | Aoai et al. | |
| 2016/0024323 A1 | 1/2016 | Tamai et al. | |

FOREIGN PATENT DOCUMENTS

| | | |
|---|---|---|
| JP | 2011-063016 | 3/2011 |
| JP | 2011-194613 | 10/2011 |
| JP | 2012-171216 | 9/2012 |
| JP | 2014-065863 | 4/2014 |
| JP | 2014-124784 | 7/2014 |

* cited by examiner

*Primary Examiner* — Irina S Zemel
*Assistant Examiner* — Jeffrey S Lenihan
(74) *Attorney, Agent, or Firm* — Cooper & Dunham LLP

(57) ABSTRACT

A processing fluid for image forming by an aqueous ink includes a flocculant to aggregate a colorant in the aqueous ink, a water-soluble organic solvent, a polymer particle, and water. The polymer particle has a core-shell structure with a core portion including a wax and a shell portion having a lower critical solution temperature of 30 degrees C. or higher.

9 Claims, 3 Drawing Sheets

PROCESSING FLUID FOR IMAGE FORMING BY AQUEOUS INK, IMAGE FORMING METHOD, RECORDED MATTER, AND INKJET RECORDING DEVICE

CROSS-REFERENCE TO RELATED APPLICATIONS

This patent application is based on and claims priority pursuant to 35 U.S.C. § 119(a) to Japanese Patent Application No. 2015-088038 filed on Apr. 23, 2015, in the Japan Patent Office, the entire disclosures of which are hereby incorporated by reference herein.

BACKGROUND

Field of the Invention

The present invention relates to a processing fluid for image forming by an aqueous ink, an image forming method using the processing fluid, recorded matter, and an inkjet recording device.

Description of the Related Art

Inkjet ink uses pigment ink in most cases. However, the pigment ink is easily peeled off from printed matter of the pigment ink because the pigment is attached to the uppermost surface of the recording medium. That is, such printed matter is inferior about abrasion resistance.

In addition, the quality of images demanded for inkjet recording methods is on a par with the quality of offset printing when images are printed on paper for use in commercial printing, typically coated paper having low ink absorption. However, such coated paper has a low permeability, so that droplets are united on the paper, causing oozing at borders between inks having different colors and the ink and the recording medium.

SUMMARY OF THE INVENTION

According to the present disclosure, provided is an improved processing fluid for image forming by an aqueous ink and the processing fluid includes a flocculant to aggregate a colorant in the aqueous ink, a water-soluble organic solvent, a polymer particle, and water. The polymer particle has a core-shell structure with a core portion including a wax and a shell portion having a lower critical solution temperature of 30 degrees C. or higher.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DESCRIPTION OF THE EMBODIMENTS

Figure 1:
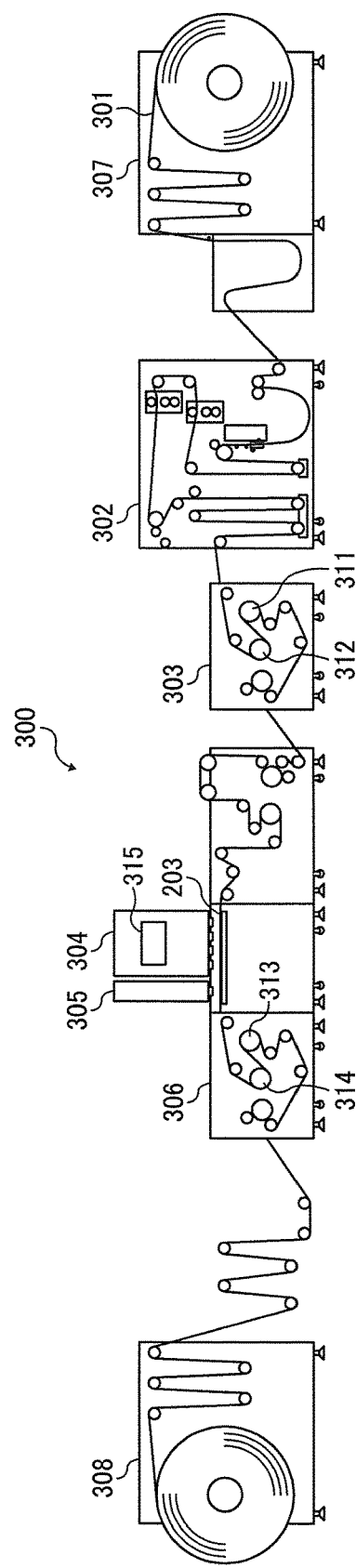
FIG. 1 is a diagram illustrating an example of an ink jet recording device according to an embodiment of the present invention.

When an ink contains a wax, discharging reliability and discharging stability of the ink tend to deteriorate, which has a significant adverse impact on the image quality. To the contrary, when a processing fluid contains a wax, discharging reliability and discharging stability are not significantly affected. In addition, it is possible to apply the processing fluid to a recording medium by a method other than an inkjet method such as a roller application method and a spraying method.

However, if a processing fluid contains a wax, the wax tends to agglomerate or the storage stability of the processing fluid easily deteriorates.

As a result of an investigation, the present inventors have found that if a processing fluid satisfies the following, the storage property of the processing fluid is secured.

A processing fluid for image forming by an aqueous ink includes a flocculant configured to aggregate a colorant in the aqueous ink, a water-soluble organic solvent, a polymer particle, and water, wherein the polymer particle has a core-shell structure with a core portion including a wax and a shell portion having a lower critical solution temperature of 30 degrees C. or higher.

Also, due to drying at temperatures higher than the lower critical solution temperature after the image forming by an aqueous ink, the image quality is prevented from deterioration and the abrasion resistance of the image is improved. Thus, the present invention was made.

The present disclosure provides a processing fluid to prevent deterioration of the quality an image on a recording medium due to unification of an aqueous ink on the recording medium and improve abrasion resistance of the image in image forming using the aqueous ink.

Embodiment 1 of the present disclosure is as follows:

A processing fluid for image forming by an aqueous ink includes a flocculant to aggregate a colorant in the aqueous ink, a water-soluble organic solvent, a polymer particle, and water. The polymer particle has a core-shell structure with a core portion including a wax and a shell portion having a lower critical solution temperature of 30 degrees C. or higher.

The present disclosure will be described below in detail with reference to several embodiments and accompanying drawings. Embodiment 1 of the present disclosure includes the following 2 to 9. Therefore, these are also described.

2. In the processing fluid of Embodiment 1 mentioned above, the shell portion has a lower critical solution temperature of from 40 to 80 degrees C.

3. In the processing fluid of Embodiment 1 or 2 mentioned above, the flocculant includes a water soluble cationic polymer.

4. In the processing fluid of 3 mentioned above, wherein the water-soluble cationic polymer has a quaternary ammonium cation in the main chain of the water-soluble cationic polymer.

5. In the processing fluid of 4 mentioned above, the water-soluble cationic polymer includes a repeating unit represented by the following chemical formula 1.

Chemical formula 1

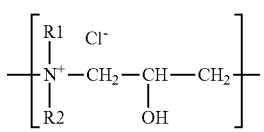

In the Chemical formula 1, R1 and R2 each, independently represent alkyl groups having 1 to 8 carbon atoms, hydroxyalkyl groups having 1 to 8 carbon atoms, alkenyl groups having 2 to 8 carbon atoms, or benzyl groups.

6. A method for forming an image includes applying the processing fluid of any one of Embodiment 1 to 5 mentioned above to a recording medium, discharging the aqueous ink to the recording medium by an inkjet method to form an image thereon, and heating the recording medium on which the image is formed.
7. The image forming method according to 6 mentioned above, wherein the recording medium has a coated layer on at least one surface of a substrate of the recording medium.
8. Recorded matter includes a recording medium and an image recorded on the recording medium by the image forming method of 6 or 7 mentioned above.
9. An inkjet recording device includes a processing fluid applying device to apply the processing fluid of any one of Embodiment 1 to 5 mentioned above to a recording medium, an image forming device to discharge an aqueous ink to the recording medium by an inkjet method to form an image thereon, and a drier to heat the recording medium on which the image is formed.

Processing Fluid

The processing fluid of the present disclosure contains a flocculant to aggregate a colorant in an aqueous ink, a water-soluble organic solvent, a polymer particle, and water. The polymer particle has a core-shell structure and the core portion thereof contains a wax and the shell portion thereof has a lower critical solution temperature of 30 degrees C. or higher.

In addition, the processing fluid of the present disclosure may further optionally contain materials for use in known processing fluids such as a surfactant, a permeating agent, a defoaming agent, a pH regulator, a preservatives and fungicides, and a corrosion inhibitor.

Flocculant to Aggregate Colorant in Aqueous Ink

Flocculants to aggregate a colorant in an aqueous ink are added to destroy dispersion of an ink and promote agglomeration thereof to obtain high image density and dot uniformity.

As a result, unification of droplets of an ink, bleed, and white voids (non-discharged portion) are prevented, thereby improving the image quality.

The content of the flocculant in the processing fluid is preferably from 10 to 70 percent by mass and more preferably from 30 to 60 percent by mass. When the content is 10 percent by mass or higher, the pigment in the ink demonstrates agglomeration power, thereby obtaining good image quality. When the content is 70 percent by mass or less, the image quality is sufficiently secured.

The kind of the flocculant is not particularly limited. For example, water-soluble cationic polymers, acids, are multivalent metal salts are suitable. Of these, water-soluble cationic polymers are preferable.

As the water-soluble cationic polymer, quaternary ammonium salt type cationic polymers are preferable. Specific examples thereof include, but are not limited to, polymers of dialkylaryl ammonium chloride, polymers of dialkyl aminoethyl (meth)acrylate quaternary ammonium salts, polymers of modified polyvinyl alcohol dialkyl ammonium salts, polymers of dialkyl diaryl ammonium salts, and copolymers of polyamine-epichlorohydrin. Of these, the cationic polymer having the repeating unit represented by Chemical formula 1 is particularly preferable.

Specific examples of other water-soluble cationic polymers include, but are not limited to, cationic specially-modified polyamine compounds, cationic polyamide polyamine compounds, cationic urea-formarine resin compounds, cationic polyacrylic amide compounds, cationic alkyl ketene dimers, cationic dicyane diamide compounds, cationic dicyan diamide-formarine condensation compounds, cationic dicyan diamide-polyamine condensation compounds, cationic polyvinyl formamide compounds, cationic polyvinyl pyridine compounds, cationic polyalkylene polyamine compounds, and cationic epoxy polyamide compounds.

As the acid, water-soluble aliphatic organic acids are preferable. Specific examples thereof include, but are not limited to, lactic acid, malic acid, citric acid, dihydroxysuccinic acid, oxalic acid, malonic acid, succinic acid, adipic acid, acetic acid, propionic acid, butyric acid, valeric acid, gluconic acid, pyruvic acid, and fumaric acid. In addition, amine salts of these organic acids are also suitable.

Examples of multivalent metal salts are water-soluble divalent metal salts and water-soluble monovalent alkali metal salts.

Specific examples of the water-soluble divalent metal salts include, but are not limited to, magnesium sulfate, aluminum sulfate, manganese sulfate, nickel sulfate, ferric sulfate (II), copper sulfate (II), zinc sulfate, ferric nitride (II), ferric nitride (III), cobalt nitride, strontium nitride, copper nitride (II), nickel nitride (II), lead nitride (II), manganese nitride (II), nickel chloride (II), calcium chloride, tin chloride (II), strontium chloride, barium chloride, magnesium chloride, calcium lactate, and calcium nitride.

Specific examples of the water-soluble monovalent alkali metal salts include, but are not limited to, sodium sulfate, potassium sulfate, lithium sulfate, sodium hydrogen sulfate, potassium hydrogen sulfate, sodium nitride, potassium nitride, sodium carbonate, potassium carbonate, sodium hydrogen carbonate, potassium hydrogen carbonate, sodium chloride, and potassium chloride.

Polymer Particle

The polymer particles has a core-shell structure having a core portion and a shell portion covering the surface of the core portion. In the core-shell structure, two or more kinds of polymers having different compositions are present in a particle and phase-separated. Also, in the core-shell structure, the core portion is completely or partially covered with the shell portion. Also, part of the polymer of the shell portion may form a domain, etc. in the core portion. In addition, the core-shell structure includes a multi-layer structure having three or more layers including at least one layer having a different composition between the core portion and the shell portion.

The polymer particle is preferably dispersible in water as a form of aqueous emulsion and added to the processing fluid as a form of polymer emulsion. In the polymer particle dispersible in water as a form of aqueous emulsion, substantially water-insoluble polymers are dispersed in a particulate form. In addition, the polymer emulsion includes generally referred to as emulsions, dispersion, latex, and suspension.

The volume average particle diameter of the polymer particle has no particular limit. For example, the volume average particle diameter is preferably from 50 to 200 nm and more preferably from 80 to 150 nm. The viscosity of the polymer emulsion is not excessively high if the viscosity is within the range of from 50 to 200 nm. For this reason, adjustment as the processing fluid becomes easy. The volume average particle diameter is measured by MicroTrack UPA (manufactured by Nikkiso Co., Ltd.) according to a dynamic light scattering method.

The content of the polymer particle in the processing fluid has no specific limit. For example, the content is preferably from 1 to 10 percent by mass and more preferably from 2 to 5 percent by mass. When the content is within the range of from 1 to 10 percent by mass, the viscosity of the processing fluid is not excessively high so that applying the processing fluid to a recording medium becomes easy.

Core Portion

The core portion has a wax and other optional components.

The wax has no particular limit. For example, paraffin wax, carnauba wax, rice wax, polyethylene wax, and polypropylene wax are suitable. Of these, polyethylene wax is preferable.

Shell Portion

It is suitable that the shell portion has a lower critical solution temperature of 30 degrees C. or higher. For this reason, the shell portion is formed by using a polymer having a lower critical solution temperature of 30 degrees C. or higher. In addition, the shell portion may have further optional components having no impact on the lower critical solution temperature.

When the lower critical solution temperature is lower than 30 degrees C., the wax is discharged into the solution at room temperature (23 degrees C.), which may lead to thickening of the processing fluid and degradation of storage property thereof. In terms of improvement or prevention of thickening of the processing fluid and degradation of storage property, the lower critical solution temperature is preferably 40 degrees C. or higher. However, the lower critical solution temperature is preferably 80 degrees C. or lower to efficiently discharge wax in a drying process to improve the abrasion resistance of a recorded image. In addition, when the lower critical solution temperature is 90 degrees C. or higher, the heating temperature in the drying process is raised, which is not preferable in terms of power consumption.

When the polymer is dissolved in water, water molecules are adsorbed around the polymer chains. When the temperature is raised, the hydrogen bond is severed. That is, the polymer and water are phase-separated so that the polymer shows hydrophobicity. The lower critical solution temperature in the present disclosure means the temperature at which this phase separation occurs.

The lower critical solution temperature can be measured as follows.

20 mL of a sample in which 10 g of polymer particles is dissolved in 50 mL distilled water is placed in a test tube, which is thereafter capped. The test tube is fixed in a constant temperature water tank at 10 degrees C. and left to rest for 10 minutes. If the sample is not clouded after the test tube is left to rest, the temperature of the constant temperature tank is raised 2 degrees C. by 2 degrees C. to continue the same observation until the sample is clouded. The temperature at which the sample is clouded is determined as the lower critical solution temperature.

The polymer having a lower critical solution temperature of 30 degrees C. or higher has no particular limit. For example, polymers having structure units deriving from (meth)acrylamide derivatives and including other optional monomers are preferable.

The (meth)acrylamide derivatives have no particular limit. For example, N-alkyl or N-alkylene substituted (meth)acrylamides are preferable.

Specific examples of such N-alkyl or N-alkylene substituted (meth)acrylamides include, but are not limited to, N-ethylacrylamide, N,N-dimethylacrylamide, N,N-diethylacrylamide, N-ethylmethacrylamide, N,N-dimethylmethacrylamide, N-isopropylacrylamide, N-n-propylacrylamide, N-n-propylmethacrylamide, N-acryloyl pyrrolidine, N-methacryloyl pyrrolidine, N-acryloyl piperidine, N-acryloyl hexahydroazepine, N-acryloyl morpholine, N-acetylacrylamide, and N-acetylmethacrylamide.

These may be used alone or in combination of two or more thereof. Of these, taking into account the range of the lower critical solution temperature of from 30 to 80 degrees C., N-isopropylacrylamide, N,N-dimethylacrylamide, N-acetylacrylamide, and N-acetylmethacrylamide are particularly preferable.

Specific examples of the other monomers include, but are not limited to, alkylacrylates having side chains of alkyl groups having one to five carbon atoms such as methylcrylate, ethylacrylate, n-propylacrylate, and isopropylacrylate; alkylmethacrylates having side chains of alkyl groups having one to five carbon atoms such as ethylmethacrylate, n-propylmethacrylate, and isopropylmethacrylate; hydroxyalkyl(meth)acrylates such as hydroxymethylacrylate, hydroxymethylmethacrylate, 2-hydroxyethylacrylate, 2-hydroxyethylmethacrylate, 2-hydroxypropylacrylate, 2-hydroxypropylmethacrylate, 3-hydroxypropylacrylate, 3-hydroxypropylmethacrylate, 2-hydroxybutylacrylate, 2-hydroxybutylmethacrylate, 4-hydroxybutylacrylate, 4-hydroxybutylmethacrylate, 2-hydroxypentylacrylate, 2-hydroxypentylmethacrylate, 6-hydroxyhexylacrylate, and 6-hydroxyhexylmethacrylate; α,β-unsaturated carboxylic acid having at least one carboxylic group in the molecule such as acrylic acid, methacrylic acid, itaconic acid, maleic acid, maleic anhydride, aconitic acid, fumaric acid, and crotonic acid; vinyl monomers having hydroxy group such as hydroxyethylesters of acrylic acid or methacrylic acid; acrylamides; acrylonitriles; and glycidyl esters of (meth)acrylic acid. These may be used alone or in combination of two or more thereof.

The ratio of N-alkyl or N-alkylene-modified (meth)acrylamide in all the monomers constituting the polymer having a lower critical solution temperature of from 30 to 80 degrees C. is preferably from 30 to 99 mol percent and more preferably from 40 to 95 mol percent. When the ratio is 30 to 99 mol percent, particles are easily formed.

The average thickness of the shell portion has no specific limit. For example, the average thickness is preferably from 0.01 to 2 μm and more preferably from 0.4 to 1.5 μm. When the average thickness is from 0.01 to 2 μm, the feature of the shell portion is demonstrated suitably and the wax in the core portion is efficiently exposed.

The average thickness of the shell portion is the average of the thickness of arbitrarily-selected 10 particle particles. The thickness of the shell portions of the 10 particles is measured by a transmission-type electron microscope (TEM), a field-emission-type scanning electron microscope (FE-SEM), or a scanning probe microscope (SPM).

Water-Soluble Organic Solvent

The water-soluble organic solvent is added to maintain the moisture in the processing fluid. Even when the moisture in the processing fluid evaporates in the nozzle and application device for the processing fluid, an increase of the viscosity of the processing fluid is suppressed. Therefore, occurrence of non-discharging, curving, etc. is reduced even when the processing fluid is applied in an inkjet method, thereby maintaining the discharging stability of the processing fluid. Therefore, it is preferable to use a water-soluble organic solvent having a high equilibrium moisture content. The equilibrium moisture content means the amount of water obtained when evaporation of the water in the solvent and absorption of the water in air are in an equilibrium condition when a mixture of a water-soluble organic solvent or solid wetting agent and water are left open in air at a constant temperature and humidity environment.

Specifically, the equilibrium moisture content in the present disclosure is obtained as follows: while keeping the temperature and the humidity in a desiccator using a saturated solution of potassium chloride in the range of from 22 to 24 degrees and from 77 to 83 percent, a petri dish on which 1 g of each of hydrosoluble organic solvent is placed is stored in the desiccator until no mass change is observed followed by calculation based on the following Equation 1.

Equilibrium moisture content(percent by mass)=
(amount of moisture absorbed in water-soluble
organic solvent)/(amount of water-soluble
organic solvent+amount of moisture absorbed in
water-soluble organic solvent)×100

Specific examples of the water-soluble organic solvent include, but are note limited to, polyols, polyol alkyl ethers, polyol aryl ethers, nitrogen-containing heterocyclic compounds, amides, amines, sulfur-containing compounds, propylene carbonates, and ethylene carbonates.

Of these, a water-soluble organic solvent having an equilibrium moisture content of 30 percent by mass or more is preferable. A water soluble organic solvent having an equilibrium moisture content of 40 percent by mass or more (hereinafter referred to as water-soluble organic solvent A) is more preferable.

Polyols are particularly preferable. Specific examples thereof include, but are not limited to, diethylene glycol, triethylene glycol, tetraethylene glycol, 1,3-butanediol, glycerin, diglycerin, 1,2,3-butanetriol, and 1,2,4-butanetriol. Of these, glycerin and 1,3-butanediol are particularly preferable because they have low viscosity when containing water and can be stably maintained without aggregating colorants.

It is suitable to use a water-soluble organic solvent and/or a solid wetting agent having an equilibrium moisture content of less than 30% by mass can be used instead of or in combination with the water-soluble organic solvent A.

An example thereof is a sugar group in addition to the compounds specified as the water-soluble organic solvent.

Specific examples of the polyols include, but are not limited to, ethylene glycol, polyethylene glycol, propylene glycol, dipropylene glycol, tripropylene glycol, polypropylene glycol, 3-methyl-1,3-butanediol, 1,5-pentanediol, 2-methyl-2,4-pentanediol, hexylene glycol, 1,6-hexane diol, 1,2,6-hexane triol, trimethylol ethane, and trimethylol propane.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, ethylene glycol mono-2-ethyl hexylether, and propylene glycol monoethyl ether.

Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrolidone, N-methyl-2-pyrolidone, 1,3-dimethyl-2-imidazolidinone, ϵ-caprolactam, and γ-butylolactone.

Specific examples of the amides include, but are not limited to, formamide, N-methyl formamide, N,N-dimethylformamide, and N,N-diethylformamide.

Specific examples of the amines include, but are not limited to, monoethanol amine, diethanol amine, triethanol amine, N,N-dimethyl monoethanol amine, N-methyl diethanol amine, N-methylethanol amine, N-phenyl ethanol amine, and 3-aminopropyl diethylamine.

Specific examples of the sulfur-containing compounds include, but are not limited to, dimethyl sulphoxide, sulfolane, and thiodiglycol.

Specific examples of the sugar groups include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and contain materials that are present widely in nature, for example, α-cyclodextrine and cellulose. In addition, specific examples of derivatives of these sugar groups include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid. Of these, sugar alcohols are preferable and specific examples thereof include, but are not limited to, maltitol and sorbit.

The contents of the water-soluble organic solvent and the wetting agent have no particular limit and are preferably from 5 to 80 percent by mass and more preferably from 10 to 20 percent by mass in the entire of the processing fluid. When the addition amount is in the range of from 5 to 80 percent by mass, the moisture in the processing fluid is sufficiently maintained and the viscosity thereof is not excessively high, so that the processing fluid is efficiently applied to a recording medium.

Surfactant

Surfactants are added to improve the wettability of the processing fluid to a recording medium.

The content of the surfactant in the processing fluid is preferably from 0.001 to 5 percent by mass and more preferably from 0.05 to 2 percent by mass. When the content is 0.001 percent by mass or more, the addition of a surfactant has a good impact. However, the impact does not further increase over 5 percent by mass.

As the surfactants, for example, fluorine-containing surfactants, silicone-based surfactants, anionic surfactants, nonionic surfactants, and betaine-based surfactants can be suitably used. Of these, fluorine-containing surfactants are preferable. These surfactants can be used alone or in combination of two or more thereof.

A fluorine-containing surfactant in which the number of carbon atoms replaced with fluorine atoms is from 2 to 16 is preferable and, 4 to 16, more preferable. When the number of carbon atoms is 2 or more, the impact of using a fluorine-containing surfactant is demonstrated, and no damage occurs to storage property when the number of carbon atoms is 16 or less.

Specific examples of the fluorine-containing surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. Of these, fluorine-containing surfactants having perfluoroalkyl groups are preferable.

Permeating Agent

Surfactants are added to improve the permeability of a processing fluid to a recording medium.

The content of the permeating agent is preferably from 0.1 to 5.0 percent by mass. When the content is 0.1 percent by mass or more, the addition of a permeating agent has a good impact on permeation of the processing fluid. In addition, when the content is 5.0 percent by mass or less, it can be prevented that the permeating agent is separated from the solvent, thereby saturating improvement of permeability.

The permeating agent is preferably non-wetting agent-type polyol compounds or glycol ether compounds having 8 to 11 carbon atoms and preferably has a solubility of from 0.2 to 5.0 percent by mass in water at 25 degrees C. Of these, 2-ethyl-1,3-hexane diol (solubility: 4.2 percent at 25 degrees C.) and 2,2,4-trimethyl-1,3-pentanediol (solubility: 2.0 percent at 25 degrees C.) are particularly preferable.

Specific examples of the other non-wetting agent-type polyol compounds include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butanediol, 2,4-dimethyl-2,4-pentanediol, 2,5-dimethyl-2,5-hexane diol, and 5-hexene-1,2-diol.

The other permeating agent usable in combination can be any agent capable of being dissolved in a processing fluid and adjusted to have desired properties. Specific examples thereof include, but are not limited to, alkyl and aryl ethers of polyols such as ethylene glycol monophenylether, ethylene glycol monoaryl ether, diethylene glycol monobutyl ether, diethylene glycol monophenyl ether, propylene glycol monobutyl ether, and tetraethylene glycol chlorophenyl ether and lower alcohols such as ethanol.

Defoaming Agent

Defoaming agents are added to suppress foaming of the processing fluid. In general, to a liquid such as water having a high surface tension, a force to make the surface area as least as possible is applied so that foaming never or little occurs. However, a liquid having a low surface tension and a high viscosity is easy to foam and the formed foams are not easily defoamed. When the processing fluid of the present disclosure includes the water-soluble cationic polymer, the water-soluble organic solvent, the surfactant, etc., the surface tension of the processing fluid tends to decrease and the viscosity thereof tends to increase. Therefore, it is preferable to add a defoaming agent.

The content of the defoaming agent in the processing fluid is preferably from 0.01 to 10 percent by mass and more preferably from 0.02 to 5 percent by mass. When the content is 0.01 percent by mass or greater, defoaming power is sufficient. In addition, when the content is 10 percent by mass or less, the defoaming agent is surely dissolved in the processing fluid.

pH Regulator

The pH regulator can be any agent capable of adjusting the pH of prescribed processing fluid to be from 6 to 10 and suitably selected to a particular application. When the pH is 10 or less, the agglomeration power does not significantly deteriorate. Moreover, when the pH is 6 or higher, transfer members such as transfer rollers that contact the processing fluid are not corroded, thereby having no problem to transfer features.

Specific examples of the pH regulator include, but are not limited to, alcohol amines, hydroxides of alkali metal elements, hydroxides of ammonium, phosphonium hydroxides, and alkali metal carbonates.

Specific examples of the alcohol amines include, but are not limited to, diethanol amine, triethanol amine, and 2-amino-2-ethyl-1,3-propane diol. Specific examples of the hydroxides of alkali metal elements include, but are not limited to, lithium hydroxide, sodium hydroxide, and potassium hydroxide. Specific examples of the hydroxides of ammonium include, but are not limited to, ammonium hydroxide and quaternary ammonium hydroxide. A specific example of the hydroxides of phosphonium is a hydroxide of quaternary phosphonium.

Specific examples of the alkali metal carbonates include, but are not limited to, lithium carbonate, sodium carbonate, and potassium carbonate.

Preservatives and Fungicides

Specific examples of the preservatives and fungicides include, but are not limited, dehydrosodium acetate, sodium sorbinate, 2-pyridine thiol-1-oxide sodium, sodium benzoate, pentachlorophenol sodium, and 1,2-benzoisothiazoline-3-on sodium.

Corrosion Inhibitor

Specific examples of the corrosion inhibitor include, but are not limited to, acid sulfite, thiosodium sulfate, ammonium thiodiglycolate, diisopropyl ammonium nitrite, dicyclohexyl ammonium nitrite, pentaerythritol quaternary nitrite, and 1,2,3-benzotriazole.

Ink

The ink for use in the image forming method of the present disclosure has no particular selection limit and can be known ink containing a colorant, a water-soluble organic solvent, a surfactant, a permeating agent, a water-dispersible resin, etc.

The viscosity of the ink is from 5 to 20 mPa·S at 25 degrees C. When the viscosity is 5 mPa·s or greater, the density and the quality of an image to be recorded are improved. Moreover, when the viscosity is 20 mPa·s or less, good discharging stability is secured. The viscosity can be measured by, for example, a viscometer (RE-550L, manufactured by TOKI SANGYO CO., LTD.).

The surface tension of an ink is preferably from 20 to 35 mN/m and more preferably from 20 to 30 mN/m at 25 degrees C. When the surface tension is in the range of from 20 to 35 mN/m, permeability of the ink tends to be high. When recorded in plain paper with the ink, drying property is good, thereby suppressing color bleed. Moreover, the attached portion of the processing fluid on a recording medium tends to be wet, saturation of printed matter becomes high, thereby suppressing white voids. When the surface tension is greater than 35 mN/m, the leveling of the ink on a recording medium tends to never or little occur, thereby prolonging the drying time.

Colorant

As the colorant, pigments are mainly used considering the weatherability. Optionally, dyes can be added to adjust the color tone in an amount in which the weatherability is not degraded.

The pigment has no particular limit. For example, inorganic pigments or organic pigments for black or color are suitably selected to a particular application. These pigments can be used alone or in combination of two or more thereof.

The content of the colorant in the ink is preferably from 2 to 15 percent by mass and more preferably from 3 to 12 percent by mass as the solid portion. When the content ratio of the pigment is 2 percent by mass or more, the saturation or the density of recorded matter does not become low. When the content ratio of the pigment is 15 percent by mass or less, it is highly unlikely that viscosity increases, thereby degrading discharging stability.

The contents of the solid portions in an ink can be measured by a known method. For example, a method for separating only a water-dispersible colorant and a water soluble resin from the ink is suitable.

As the inorganic pigments, specific examples thereof include, but are not limited to, titanium oxide, iron oxide, calcium oxide, barium sulfate, aluminum hydroxide, barium yellow, cadmium red, and chrome yellow, carbon black manufactured by known methods such as contact methods, furnace methods, and thermal methods.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used. Of these pigments, pigments having good affinity with water are particularly preferable.

Preferred specific examples of the pigments for black include, but are not limited to, carbon black (C.I. Pigment Black 7) such as furnace black, lamp black, acetylene black, and channel black, metals such as copper and iron (C.I. Pigment Black 11), metal oxides compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, and 183; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rhodamine Lake), 3, 5:1, 16, 19, 23, and 38; C.I. Pigment Blue 1, 2, 15, 15:1, 15:2, 15:3 (Phthalocyanine Blue), 16, 17:1, 56, 60, and 63; and C.I. Pigment Green 1, 4, 7, 8, 10, 17, 18, and 36.

Water-Soluble Organic Solvent

The water-soluble organic solvents for use in an ink have no particular limit and preferably those specified for the processing fluid. The mass ratio of a water-dispersible colorant to the water-soluble organic solvent in the ink has an impact on the discharging stability of the ink jetted from the recording head. If the addition amount of the water-soluble organic solvent is small while the amount of the solid portion of the water-dispersible colorant is large, water around the ink meniscus of nozzles tends to evaporate quickly, thereby degrading the discharging performance.

The content of the water-soluble organic solvent in an ink is preferably from 20 to 50 percent by mass and more preferably from 20 to 45 percent by mass. When the content is 20 percent by mass or more, discharging stability does not deteriorate or waste ink does not easily fixate on the maintenance unit of a recording device. In addition, when the content is 50 percent by mass or less, the drying property of an ink on paper does not deteriorate or the quality of recorded matter does not deteriorate.

Surfactant

As the surfactant for use in the ink, the surfactant for use in the processing fluid specified above are preferable. Of these, it is preferable to select a surfactant that has a low surface tension, a high permeability, and an excellent leveling property without degrading dispersion stability irrespective of the kind of the water-dispersible colorant and the combinational use with the water-soluble organic solvent. Specifically, anionic surfactants, nonionic surfactants, silicone-containing surfactants, and fluorine-containing surfactants are preferable. Of these, silicone-containing surfactants and fluorine-containing surfactants are particularly preferable. These surfactants can be used alone or in combination or two or more thereof.

The content of the surfactant in the ink is preferably from 0.01 to 3.0 percent by mass and more preferably from 0.5 to 2 percent by mass. When the content of a surfactant is 0.01 percent by mass or more, the addition thereof has a good impact.

When the content is 3.0 percent by mass or less, it is highly unlikely that the permeability of a surfactant to a recording medium excessively increases so that the density of a recorded image lowers or strike-through occurs.

Permeating Agent

As the permeating agent for use in an ink, the permeating agent for use in the processing fluid specified above are preferable.

The content of the permeating agent in an ink is preferably from 0.1 to 4.0 percent by mass. When the content is 0.1 percent by mass or more, drying property does not deteriorate, thereby preventing occurrence of image blur to recorded images. When the content is 4.0 percent by mass or less, it is highly unlikely that the dispersion stability of a colorant deteriorates, nozzles easily clog, permeation into a recording medium becomes excessively high so that the image density decreases, or strike-through occurs.

Water-Dispersible Resin

Water-dispersible resins form films on the surface to which an ink is attached, thereby enhancing water repellency, water resistance, and weatherability of recorded images and increasing density and color saturation.

Specific examples of the water-dispersible resins include, but are not limited to, condensation-based synthetic resins, addition-based synthetic resins, and natural polymers. These can be used alone or in combination of two or more thereof.

Specific examples of the condensation-based synthesis resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene resins, polyvinyl alcohol resins, polyvinyl ester resins, polyacrylic acid resins, and unsaturated carboxylic acid resins.

Specific examples of the natural polymers include, but are not limited to, celluloses, rosins, and natural rubber. Of these, polyurethane resin particulates, acrylic-silicone resin particulates, and fluorine-containing resin particulates are preferable.

Moreover, the water-dispersible resins can be homopolymers or copolymers and any of single phase structure type, core-shell type, and power-feed type emulsions.

As the water-dispersible resin, it is suitable to use resins having hydrophilic groups and self-dispersiblity or resins which have no dispersibility but is imparted by a surfactant or a resin having a hydrophilic group. Of these, emulsions of resin particles obtained by emulsification polymerization or suspension polymerization of ionomers or unsaturated monomers of a polyester resin or polyurethane resin are preferable.

Since dispersion destruction or breakage in molecule chains as a result of hydrolytic cleavage occurs to a water-dispersible resin in a strong alkali or strong acid environment, pH before the water-dispersible resin is added to an ink is preferably from 4 to 12 and more preferably from 6 to 11 and furthermore preferably from 7 to 9 in terms of miscibility with a water-dispersible colorant in particular.

The average particle diameter (D50) of the water-dispersible resin relates to the viscosity of a liquid dispersion. If the compositions and the concentration of the solid portion thereof are the same, viscosity increases as the particle diameter decreases. Therefore, the average particle diameter (D50) of the water-dispersible resin is preferably 50 nm or more in order to prevent viscosity from becoming excessively high when an ink is prepared using the water-dispersible resin. In addition, particles having large particle diameters, for example, several tens μm, which is larger than the size of the nozzle of the head of a recording device. If particles having such large particle sizes are present in an ink, discharging stability is degraded. To secure discharging stability of an ink, the average particle diameter (D50) of the water-dispersible resin in the ink is preferably 200 nm or less and more preferably 150 nm or less.

In addition, since the water-dispersible resin fixes the water-dispersible colorant onto a recording medium, it is preferable to form a film at room temperature. Therefore, the minimum film-forming temperature (MFT) of the water-dispersible resin is preferably 30 degrees C. or lower. The glass transition temperature of the water-dispersible resin is preferably from −40 degrees C. or higher and more preferably from −30 degrees C. or higher. When the glass transition temperature is −40 degrees C. or lower, the viscosity of a resin film becomes strong, so that tackiness (stickiness and viscosity) tends to occur to recorded matter.

The content of the water-dispersible resin in an ink is preferably from 1 to 15 percent by mass and more preferably from 2 to 7 percent by mass in a solid form.

In addition to the components mentioned above, pH regulators, preservatives and fungicides, chelating reagents, corrosion inhibitors, antioxidants, ultraviolet absorbents, oxygen absorbents, light stabilizing agents, etc., can be added to an ink.

pH Regulator

The pH regulator can be any agent capable of adjusting the pH of an ink to be from 7 to 11 without having an adverse impact on a prescribed ink and suitably selected to a particular application. If the pH of an ink is within this range, the ink does not melt the head or an ink supply unit of a recording device. Therefore, the ink is not altered or leaked or problems such as bad discharging do not occur.

As the pH regulator, the same as specified for the processing fluid can be used.

Preservatives and Fungicides

Specific examples of the preservatives and fungicides include, but are not limited, dehydrosodium acetate, sodium sorbinate, 2-pyridine thiol-1-oxide sodium, sodium benzoate, pentachlorophenol sodium, and 1,2-benzoisothiazoline-3-on sodium compounds.

Chelating Reagent

Specific examples of the chelating reagents include, but are not limited to, ethylene diamine sodium tetraacetate, nitrilo sodium triacetate, hydroxyethyl ethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, ammonium thiodiglycolate, diisopropyl ammonium nitrite, pentaerythritol quaternary nitdride, dicyclohexyl ammonium nitrite, and 1,2,3-benzotriazole.

Antioxidant

Specific examples of the antioxidants include, but are not limited to, phenol-based antioxidants (including hindered phenol-based antioxidants), amino-based antioxidants, sulfur-based antioxidants, and phosphorous-based antioxidants.

Ultraviolet Absorber

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Recording Medium

The recording medium on which the processing fluid of the present disclosure is usable is not particularly limited. For example, plain paper, coated paper for printing, gloss paper, special paper are suitable. The processing fluid is particularly suitable for a recording medium (coated paper) having a coated layer. The coated paper has no particular limit and can be selected to a particular application. The coated paper represents paper in which a coating material is applied to the surface of an original paper (substrate) to improve aesthetic appearance and smoothness. Such a coating material can be applied to one side or both sides of a substrate. In addition, the coating material is a mixture in which white pigments such as kaolin or calcium carbonate are mixed with a binder such as starch. Specific examples of such coated paper include, but are not limited to, art paper, coated paper, light-weight coated paper, cast paper, and micro-coated paper.

Typical coated paper has a transfer amount of pure water of from 1 to 10 mL/m$^2$ in the contact time of 10 ms as measured by a dynamic scanning absorptometer. Dynamic scanning absorptometer (for example, K 350 series D type, manufactured by Kyowa Seiko Co., Ltd.) can precisely measure the liquid absorption amount in an extremely short period of time.

Step of Attaching Ink to Form Image

The process of attaching an ink to form an image includes discharging the ink to attach it to a recording medium to which the processing fluid is applied. It is preferable to use a method for discharging an ink by applying a stimulus (energy) thereto by a device to attach the ink. Various known inkjet recording methods can be employed. Such inkjet recording methods include a method for recording images on continuous recording medium by single path system utilizing lined heads and a method for employing a system of scanning heads.

The drive method of recording heads serving as a device to discharge an ink has no particular limit. This drive method includes a method using a piezoelectric element actuator utilizing lead zirconate titanate (PZT), a method utilizing thermal energy, a method using on-demand type heads utilizing an actuator, etc. utilizing electrostatic force, and a method recording by charge-control type heads of a continuous jetting type.

FIG. 1 is a diagram illustrating an example of the inkjet recording device to conduct the image forming method of the present disclosure.

An inkjet recording device 300 includes a recording medium transfer unit 301, a processing fluid applying unit 302 to apply the processing fluid to a recording medium 203, an image forming unit 304, and a drying unit 306.

A recording medium transfer unit 301 has a sheet feeder 307, multiple transfer rollers, and a reeling unit 308. The recording medium 203 is continuous paper (roll paper) wound like a roll, reeled out from the sheet feeder 307 by the transfer rollers, transferred along on a platen glass, and reeled up by a reeling device. A recording medium is conveyed by a conveyor belt. In the image forming process, ink is discharged from inkjet nozzles to form an image on the recording medium and the image is dried and fixed through the drying process. The reference numerals 303, 305, 311, 312, and 315 respectively represent a drying unit after pre-processing, a post-processing unit, a heat roller, a heat roller, and pre-drying unit.

Processing Fluid Applying Unit

The recording medium 203 is transferred from the recording medium transfer unit 301 and coated with the processing fluid at the pre-processing unit 302. If an image is formed on a recording medium other than a special inkjet sheet in an inkjet recording method, quality problems about feathering, density, coloring, strike-through, etc. and image robustness problems about water resistance, weatherability, etc. arise. To solve these problems, a processing fluid having a power of agglomerating ink is applied to a recording medium before image forming to improve the image quality.

In the processing fluid applying process, the processing fluid is evenly applied to the surface of a recording medium. The method for applying the processing fluid has no particular limit. Specific examples of the methods include, but are not limited to, blade coating method, gravure coating method, gravure offset coating method, bar coating method, and roll coating method.

Figure 2:
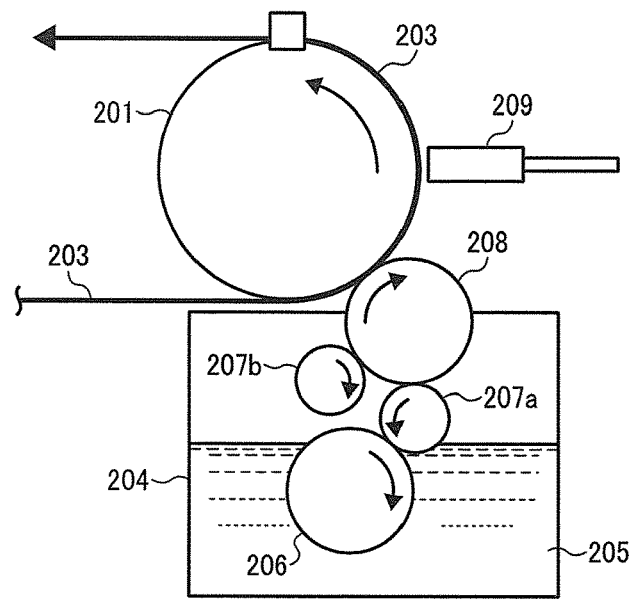
FIG. 2 is a schematic diagram illustrating an example of the configuration to apply a processing fluid in a processing unit.

FIG. 2 is a schematic diagram illustrating an example of the configuration to apply the processing fluid in the processing fluid applying unit 302. The roll coating method is described here but the method for applying the processing fluid is not limited thereto.

As illustrated in FIG. 2, the transfer rollers transfer the recording medium 203 into a processing fluid application device 204. The processing fluid application device 204 stores a processing fluid 205 and the processing fluid 205 is transferred to the roller surface of an application roller 208 in a thin film form by a stirring and supplying roller 206 and a transfer and thin-film forming rollers 207a and 207b. Thereafter, the application roller 208 rotates while being pressed against a rotatable counter roller 201 and the processing fluid 205 is applied to the surface of the recording medium 203 while the recording medium 203 passes between the application roller 208 and the rotatable counter roller 201.

In addition, the counter roller 201 can adjust the nipping pressure by a pressure adjuster 209 when the pre-processing fluid is applied, so that the application amount of the pre-processing fluid 205 can be changed. In addition, the application amount can be adjusted by changing the rotation speed of the application roller 208. The application roller 208 and the platen roller 202 are driven by a power source such as drive motor. The rotation speed thereof can be changed by changing the energy of the power source to control the application amount.

As described above, according to the method for applying the processing fluid 205 to the recording area of the recording medium 203 by the application roller 208 to improve the image quality, the processing fluid 205 having a relatively high viscosity is applied to form a thin layer so that the feathering of images can be furthermore reduced in comparison with a method for spraying a processing fluid to a recording medium using a spraying head.

Image Forming Processing Unit

After the processing fluid applying process, images are formed on the recording medium 203 in the image forming processing unit 304 according to image data.

Figure 3:
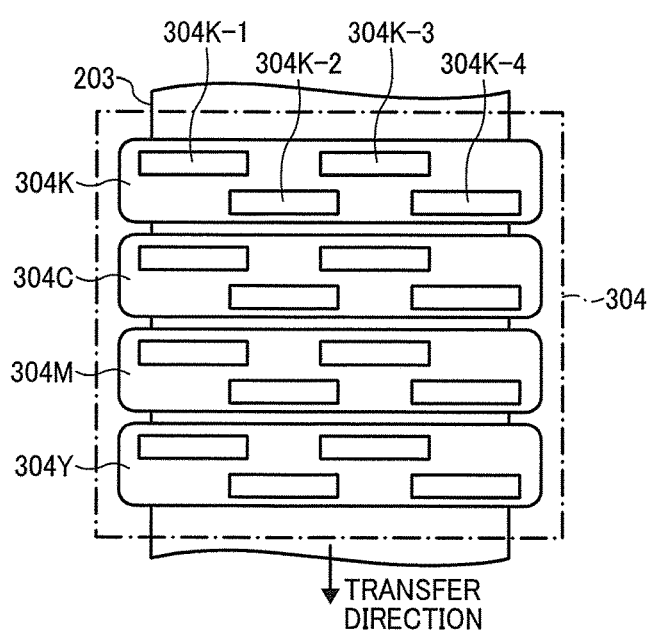
FIG. 3 is a diagram illustrating an example of a full-line type inkjet recording device according to an embodiment of the present invention.
Figure 4:
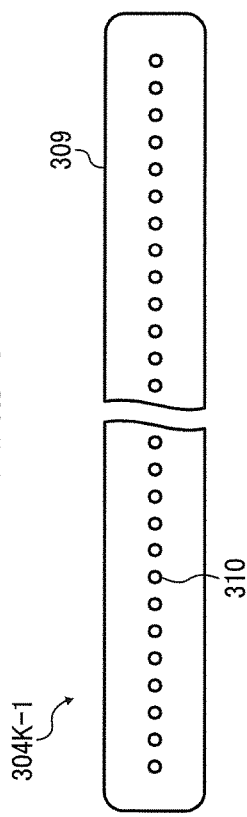
FIG. 4 is an enlarged diagram illustrating the head unit illustrated in FIG. 3.

The image forming processing unit 304 is a full-line type head including four recording heads 304K, 304C, 304M, and 304Y of black K, cyan C, magenta M, and yellow Y, respectively, arranged in this order from upstream in the transfer direction of the recording medium 203. For example, the recording head 304K has four short head units of 304K-1, 304K-2, 304K-3, and 304K-4 arranged zig-zag along the transfer direction of the recording medium 203 as illustrated in FIG. 3 to secure the print area width. FIG. 4 is an enlarged diagram illustrating the head unit 304K-1. As illustrated in FIG. 4, a nozzle surface 309 of the head unit 304K1 has multiple print nozzles 310 arranged along longitudinal direction of the head unit 304K-1 to form a nozzle array. In this embodiment, there is only one nozzle line but multiple nozzle lines can be arranged. The other recording heads 304C, 304M, and 304Y have the same configurations and the four recording heads 304K, 304C, 304M, and 304Y are arranged along the transfer direction spaced the same gap therebetween. Therefore, an image can be formed in the entire printing area width by a single image forming operation.

Drying Process

After image forming, the drying unit 306 is provided as illustrated in FIG. 1.

The drying unit has no particular limit. For example, the drying unit has heat rollers 313 and 314 and a heat-wind spraying nozzle as illustrated in FIG. 1. Subsequent to image forming, the recording medium 203 is transferred to the heat rollers 313 and 314 by the transfer rollers. The heat rollers 313 and 314 are heated to high temperatures. The moisture of the recording medium 203, to which a post-processing fluid is applied, evaporates by contact heat transfer from the heat rollers 313 and 314 so that the recording medium 203 becomes dry. Further downstream, a hot air device is provided as drying device.

The drying temperature by heating is preferably 80 degrees C. or higher and particularly preferably from 100 to 150 degrees C. When the drying temperature is 100 degrees C. or higher, the moisture and the humectant on a recording medium can be efficiently evaporated.

However, if the drying temperature surpasses 150 degrees C., when the device stops operations, the color of the recording medium may turn yellow due to extra heat depending on the kind of the recording medium, which increases the number of waste paper. This is not preferable.

Having generally described preferred embodiments of this invention, further understanding can be obtained by reference to certain specific examples which are provided herein for the purpose of illustration only and are not intended to be limiting. In the descriptions in the following examples, the numbers represent mass ratios in parts, unless otherwise specified.

EXAMPLES

Next, the present invention is described in detail with reference to Examples and Comparative Examples but not limited thereto.

Preparation of Water-Soluble Cationic Polymer

A cationic polymer was manufactured in the following manner and characteristics thereof were measured.

The characteristics were measured as follows.
Subsequent to three-hour processing at 105 degrees C., the solid portion concentration was obtained by defining the loss on heating as evaporated component using an air circulating constant temperature tank (ETAC HIFLEX FX422P, manufactured by Kusumoto Chemicals, Ltd.).
The viscosity was measured by using a viscometer (RE-550L, manufactured by TOKI SANGYO CO., LTD.) at 25 degrees C.
The weight average molecular weight was measured by gel permeation chromatography (GPC) (HLC-8320GPC Eco-SEC, manufactured by TOSOH CORPORATION) using 0.1 mol/L of phosphoric acid buffer (pH2.1) as eluent with the column temperature of 40 degrees C. and a flow speed of 1.0 mL/minute followed by molecular weight conversion using polyethylene glycol (PEG) as reference sample.

Manufacturing Example A 200.0 g (2.218 mol) of 50 percent dimethyl amine and 291.0 g (1.477 mol) of 30 percent trimethyl amine were charged in a glass autoclave (1,000 mL) equipped with a stirrer, a thermometer, and a nitrogen introducing tube. Subsequent to nitrogen replacement, 274.0 g (2.961 mol) of epichlorohydrine was introduced thereto in two hours while being cooled down to 40 degrees C. The resultant was caused to react for one hour at 40 degrees C., thereafter heated to 80 degrees C., and aged for three hours.

After being cooled down, the pH was adjusted to 5.0 by 77.0 g of 35 percent hydrochloric acid and 0.82 g of 75 percent phosphoric acid (730 ppm for solid portion) to obtain a water-soluble cationic polymer having a solid portion concentration of 58 percent, a viscosity of 21 mPa·s, and weight average molecular weight of 3,000.

Preparation of Polymer Particle Having Core-Shell Structure

A polymer particle having a core-shell structure was manufactured in the following manner and the characteristics thereof were measured.

The characteristics were measured as follows.
Subsequent to three-hour processing at 105 degrees C., the solid portion concentration was obtained by defining the loss on heating as evaporated component using an air circulating constant temperature tank (ETAC HIFLEX FX422P, manufactured by Kusumoto Chemicals, Ltd.).
The particle diameter was measured by a dynamic light scattering method using a device (Microtrac, manufactured by NIKKISO CO., LTD.).

Manufacturing Example 1

100 g of polyethylene wax (melting point: 110 degrees C.), 100 g of N-isopropyl acrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred.

Thereafter, 200 g of 0.02 percent aqueous solution of ammonium persulfate was dripped through a dripping funnel in nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 30 degrees C. were obtained. The volume average particle diameter of the polymer particle of the Manufacturing Example 1 was 130 nm.

Manufacturing Example 2

100 g of polyethylene wax (melting point: 110 degrees C.), 100 g of N-ethyl-N-ethyl methacrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred. Thereafter, 200 g of 0.02 percent aqueous solution of ammonium persulfate was dripped through a dripping funnel in a nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 40 degrees C. were obtained.

The volume average particle diameter of the polymer particle of the Manufacturing Example 2 was 130 nm.

Manufacturing Example 3

100 g of polyethylene wax (melting point: 110 degrees C.), 100 g of N-isopropyl methacrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred. Thereafter, 200 g of 0.02 percent aqueous solution of ammonium persulfate was dripped through a dripping funnel in nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 50 degrees C. were obtained.

The volume average particle diameter of the polymer particle of the Manufacturing Example 3 was 150 nm.

Manufacturing Example 4

100 g of polyethylene wax (melting point: 110 degrees C.), 100 g of N-ethyl-N-methyl acrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred. Thereafter, 200 g of 0.02 percent aqueous solution of ammonium persulfate was dripped through a dripping funnel in nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 80 degrees C. were obtained.

The volume average particle diameter of the polymer particle of the Manufacturing Example 4 was 110 nm.

Manufacturing Example 5

100 g of paraffin wax (melting point: 50 degrees C.), 100 g of N-isopropyl methacrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was evenly stirred. Thereafter, 200 g of 0.02 percent aqueous solution of ammonium persulfate was dripped through a dripping funnel in nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 30 degrees C. were obtained.

The volume average particle diameter of the polymer particle of the Manufacturing Example 5 was 100 nm Manufacturing Example 6

100 g of polyethylene wax (melting point: 110 degrees C.), 100 g of N-ethyl acrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred. Thereafter, 200 g of 0.02 percent aqueous solution of ammonium persulfate was dripped through a dripping funnel in nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 90 degrees C. were obtained.

The volume average particle diameter of the polymer particle of the Manufacturing Example 6 was 150 nm.

Manufacturing Example 7

100 g of polyethylene wax (melting point: 110 degrees C.), 100 g of N-propyl acrylamide, 30 g of acrylamide, and 20 g of methylmethacrylate were uniformly melted, mixed, and kneaded at 120 degrees C. in a glass autoclave (1,000 mL) equipped with a stirrer, a thermometer, and a nitrogen introducing tube. Thereafter, 400 g of 5 percent aqueous solution of polyvinyl alcohol, 3 g of bisacrylamide, and 1 g of 10 percent aqueous solution of lauryl sodium sulfate were placed in the autoclave and the system was cooled down to 80 degrees C. while being evenly stirred. Thereafter, 200 g of 0.02 percent aqueous solution of ammonium persulfate was dripped through a dripping funnel in a nitrogen atmosphere in 6 hours.

After the dripping, the system was held at 80 degrees for 3 hours while being stirred. The system was subsequently cooled down and adjusted by deionized water in such a manner that the solid portion concentration was 20 percent.

Thus, polymer particles having a core portion containing a wax and a shell portion having a lower critical solution temperature of 20 degrees C. were obtained.

The volume average particle diameter of the polymer particle of the Manufacturing Example 7 was 115 nm.

Examples 1 to 9 and Comparative Examples 1 to 3

Preparation of Processing Fluid

The materials shown in each column of Examples and Comparative Examples in Table 1 were mixed and stirred in a beaker for 30 minutes using a stirring bar followed by filtration by a filter to prepare a processing fluid. The values in the material columns in Table 1 are represented in percent by mass and the rest of the deionized water makes 100 percent by mass in total. In addition, the details of the compound in Table 1 are as follows.

G5615 (effective solid portion: 48 percent): polydimethyldiaryl ammonium chloride, quaternary amine cation polymer, manufactured by DKS Co. Ltd.

PAS-M-1 (effective solid portion: 50 percent): methyldiarylamine hydrochloric acid salt polymer, tertiary amine cation polymer, manufactured by Nitto Boseki Co., Ltd.

Ammonium lactate (effective solid portion: 66.2 percent): organic acid salt, manufactured by MUSASHINO CHEMICAL LABORATORY, LTD.

SOFTANOL EP-7025: Nonion-based surfactant, manufactured by Nippon Shokubai Co., Ltd.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 |
| Flocculant | Watersoluble | Manufacturing Example A | 52 | 52 | 52 | | | | 52 | 52 | 52 |

TABLE 1-continued

| | | | 1 | 2 | 3 | 4 | 5 | 6 | 7 | 8 | 9 |
|---|---|---|---|---|---|---|---|---|---|---|---|
| cationic polymer | G5615 | | | | 63 | | | | | | |
| | PAS-M-1 | | | | | 60 | | | | | |
| Salt of organic acid | Ammonium lactate | | | | | | 45 | | | | |
| Polymer particle | Manufacturing Example 1 | | 10 | | | | | | | | |
| | Manufacturing Example 2 | | | 10 | | | | | | | |
| | Manufacturing Example 3 | | | | 10 | 10 | 10 | 10 | | | |
| | Manufacturing Example 4 | | | | | | | | 10 | | |
| | Manufacturing Example 5 | | | | | | | | | 10 | |
| | Manufacturing Example 6 | | | | | | | | | | 10 |
| | Manufacturing Example 7 | | | | | | | | | | |
| Water-soluble organic solvent | 1,3-butanediol | | 15 | 15 | 15 | 15 | 15 | 15 | 15 | 15 | 15 |
| Surfactant | SOFTANOL EP7025 | | 1 | 1 | 1 | 1 | 1 | 1 | 1 | 1 | 1 |
| | Deionized water | | Rest | Rest | Rest | Rest | Rest | Rest | Rest | Rest | Rest |

| | | | Comparative Example | | |
|---|---|---|---|---|---|
| | | | 1 | 2 | 3 |
| Flocculant | Water-soluble cationic polymer | Manufacturing Example A | 52 | 52 | |
| | | G5615 | | | |
| | | PAS-M-1 | | | |
| | Salt of organic acid | Ammonium lactate | | | |
| Polymer particle | | Manufacturing Example 1 | | | 10 |
| | | Manufacturing Example 2 | | | |
| | | Manufacturing Example 3 | | | |
| | | Manufacturing Example 4 | | | |
| | | Manufacturing Example 5 | | | |
| | | Manufacturing Example 6 | | | |
| | | Manufacturing Example 7 | 10 | | |
| Water soluble organic solvent | | 1,3-butanediol | 15 | 15 | 15 |
| Surfactant | | SOFTANOL EP7025 | 1 | 1 | 1 |
| | | Deionized water | Rest | Rest | Rest |

Storage Property of Processing Fluid

Each processing fluid of Examples and Comparative Examples was charged in a vessel and left to rest for two weeks at room temperature (23 degrees C.). Thereafter, each was visually observed and the viscosity thereof was evaluated according to the following criteria: The results are shown in Table 2.

Evaluation Criteria

A: No precipitation visually observed and the viscosity change rate was in the range of from −5 percent to +5 percent B: No precipitation visually observed and the viscosity change rate was in the range of from −10 percent to +10 percent C: No precipitation visually observed and the viscosity change rate was outside the range of from −10 percent to +10 percent D: Precipitation visually observed

TABLE 2

| | | Storage property |
|---|---|---|
| Example | 1 | B |
| | 2 | A |
| | 3 | A |
| | 4 | A |
| | 5 | A |
| | 6 | A |
| | 7 | A |
| | 8 | A |
| | 9 | A |
| Comparative Example | 1 | D |
| | 2 | A |
| | 3 | A |

Examples 11 to 19 and Comparative Examples 12 to 13

Preparation of Pigment Dispersion
Preparation of Polymer Solution
After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, 0.4 g of mercapto ethanol, and 40 g of methylethyl ketone were mixed and heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 342 g of methylethyl ketone was dripped into the flask in two and a half hours.

Subsequently, a liquid mixture of 0.8 g of azobismethyl valeronitrile and 18 g of methylethyl ketone was dripped into the flask in half an hour. After one-hour aging at 65 degrees C., 0.8 g of azobismethyl valeronitrile was added followed by further one-hour aging.

After the reaction, 800 g of [Polymer Solution] having a concentration of 50 percent by mass was obtained.

Preparation of Black Pigment Dispersion 1
28 g of the [Polymer Solution], 32 g of black pigment (C.I.Pigment Black 7: Product name: Monarch 880, manufactured by Cabot Corporation), 13.6 g of 1 mol/L aqueous solution of potassium hydroxide, 20 g of methylethyl ketone, 13.6 g of deionized water were sufficiently stirred followed by kneading by a roll mill.

The thus-obtained paste was charged in 200 g of pure water. Subsequent to sufficient stirring, methylethyl ketone and water were distilled away by an evaporator to obtain [Black pigment dispersion 1] having a pigment solid portion of 20 percent.

Preparation of Black Pigment Dispersion 2
90 g of carbon black having a CTAB specific surface area of 150 $m^2/g$ and a DBP oil absorption amount of 100 ml/100 g was added to 3,000 ml of 2.5 normal solution of sodium sulfate followed by stirring at 300 rpm at 60 degrees C. to conduct reaction for ten hours for oxidation treatment. The reaction liquid was filtrated and the thus-filtered carbon black was neutralized by sodium hydroxide solution followed by ultra-filtration.

The thus-obtained carbon black was washed with water, dried, and dispersed in pure water such that the solid portion of the carbon black accounted for 30 percent by mass followed by sufficient stirring to obtain [Black pigment dispersion 2].

Preparation of Cyan Pigment Dispersion
[Cyan pigment dispersion] containing a pigment in an amount of 15 percent and a solid portion of 20 percent was obtained in the same manner as in [Black pigment dispersion 1] except that the pigment was changed to C.I.Pigment Blue.

Preparation of Magenta Pigment Dispersion
[Magenta pigment dispersion] containing a pigment in an amount of 15 percent and a solid portion of 20 percent was obtained in the same manner as in [Black pigment dispersion 1] except that the pigment was changed to C.I.Pigment Red 122.

Preparation of Yellow Pigment Dispersion
[Yellow pigment dispersion] containing a pigment in an amount of 15 percent and a solid portion of 20 percent was obtained in the same manner as in [Black pigment dispersion 1] except that the pigment was changed to C.I.Pigment Yellow 74.

Preparation of Ink Set
The materials shown in each ink column constituting the ink sets 1 and 2 shown in Tale 3 were mixed and stirred in a beaker for 20 minutes using a stirring bar followed by filtration by a filter to prepare each ink. The surfactant was DSN-403N, manufactured by DAIKIN INDUSTRIES, ltd.

The values in the material columns in Table 3 are represented in percent by mass and the rest of the deionized water makes 100 percent by mass in total.

TABLE 3

|  |  | Ink set 1 | | | | Ink set 2 | | | |
|---|---|---|---|---|---|---|---|---|---|
|  |  | Black | Cyan | Magenta | Yellow | Black | Cyan | Magenta | Yellow |
| Coloring material | Black pigment dispersion 1 | 33 | | | | | | | |
|  | Black pigment dispersion 2 | | | | | 10 | | | |
|  | Cyan pigment dispersion | | 28 | | | | 15 | | |
|  | Magenta pigment dispersion | | | 32 | | | | 18 | |
|  | Yellow pigment dispersion | | | | 28 | | | | 15 |
| Water-soluble organic solvent | 1,3-butanediol | 20 | 20 | 20 | 20 | 24 | 24 | 24 | 24 |
|  | Glycerin | 10 | 10 | 10 | 10 | 10 | 10 | 10 | 10 |
| Permeating agent | 2-ethyl-1,3-hexane diol | 2 | 2 | 2 | 2 | 2 | 2 | 2 | 2 |
| Surfactant | Adducts of perfluoroalkyl polyethylene oxide | 0.1 | 0.1 | 0.1 | 0.1 | 0.1 | 0.1 | 0.1 | 0.1 |

TABLE 3-continued

| | | Ink set 1 | | | | Ink set 2 | | | |
|---|---|---|---|---|---|---|---|---|---|
| | | Black | Cyan | Magenta | Yellow | Black | Cyan | Magenta | Yellow |
| Defoaming agent | 2,4,7,9-tetramethyl-4,7-decanediol | 0.2 | 0.2 | 0.2 | 0.2 | 0.2 | 0.2 | 0.2 | 0.2 |
| | Deionized water | Rest | Rest | Rest | Rest | Rest | Rest | Rest | Rest |

As shown in Table 4, images were formed by a combination of each processing fluid of Examples 1 to 9 and Comparative Examples 2 and 3 and the ink sets 1 and 2. Since the storage property of the processing fluid of Comparative Example 1 was evaluated as D, no image was formed.

Figure 5:
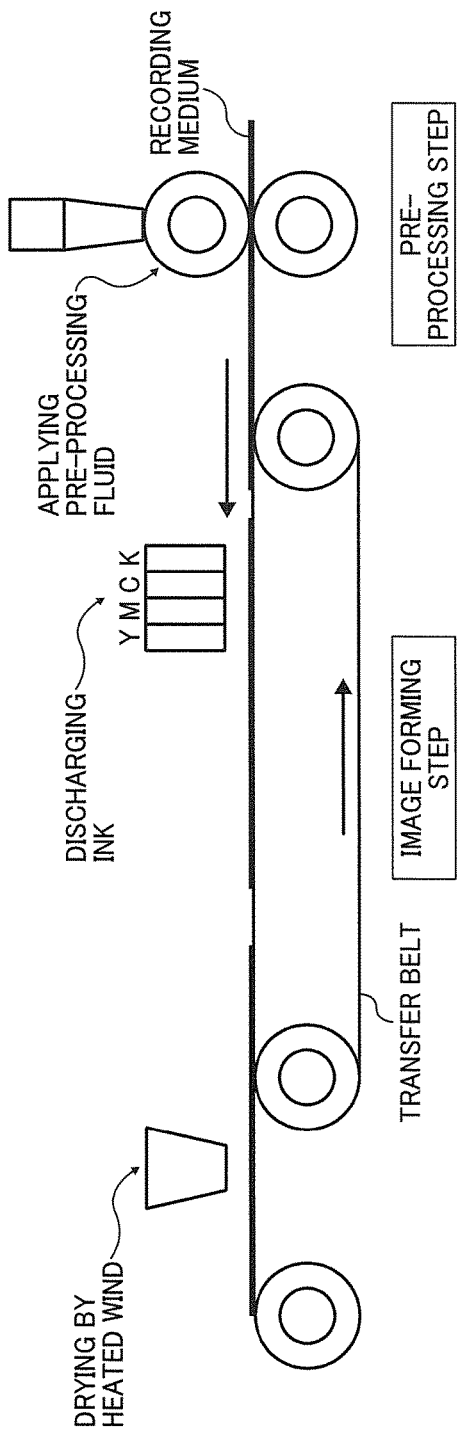
FIG. 5 is a schematic diagram illustrating an inkjet recording device for use in evaluation in Examples described later.

The inkjet recording device illustrated in FIG. 5 was prepared. In this device, there is a pre-processing step before the image forming step and recording media are conveyed by a conveyor belt. In the pre-processing step, a processing fluid that aggregates and thickens an ink on a recording medium is applied to improve the image quality. In the image forming process, the ink is discharged from inkjet nozzles to form an image on the recording medium and the image is dried and fixed by heat wind.

In this inkjet recording device, the processing fluid was applied to a recording medium (product name: OK TOPCOAT+, mass=104.7 g/m², manufactured by OJI PAPER CO., LTD.) and the ink set 1 or 2 was used for printing. Subsequent to heating to 100 degrees C. (80 degrees C. on the recording medium) for drying, an image was formed.

The image quality and the abrasion resistance of the image were checked in the following manner. The results are shown in Table 4.

Image Quality (Beading)

After a green image of the secondary color of the cyan ink and the yellow ink having a mass ratio of 1 to 1 was formed as an image chart with a single pass of 600 dpi and an attached amount of $3.2 \times 10^{-8}$ g/cm², the degree of beading was visually confirmed and evaluated according to the following criteria.

Evaluation Criteria

AA: No beading observed
A: Slight beading observed when looked hard
B: Slight beading observed without causing practical problem
C: Beading observed causing problems on the image quality
D: Beading apparently observed Abrasion Resistance of Image As the image chart, a square solid image of 6 cm×6 cm was printed with 100 duty. Three hours or longer after the printing, a non-printed recording medium (OK TOPCOAT+) installed in a clock meter (manufactured by TOYO SEIKI KOGYO CO. LTD.) was moved back and forth ten times on the image and the ink attached to the recording medium was visually observed to make evaluation according to the following criteria:

Evaluation Criteria

A: Substantially no contamination
B: Contamination observed but causing no practical problem
C: Contamination observed and can be used practically in a limited way
D: Apparent contamination with practical problems

TABLE 4

| | | Processing Fluid | Ink set | Image quality | Abrasion resistance of image |
|---|---|---|---|---|---|
| Example | 11 | Example 1 | 1 | AA | B |
| | 12 | Example 2 | 1 | AA | B |
| | 13 | Example 3 | 1 | AA | B |
| | 14 | Example 4 | 2 | A | B |
| | 15 | Example 5 | 2 | B | B |
| | 16 | Example 6 | 1 | B | B |
| | 17 | Example 7 | 1 | AA | B |
| | 18 | Example 8 | 2 | AA | B |
| | 19 | Example 9 | 1 | AA | C |
| Comparative Example | 12 | Comparative Example 2 | 2 | AA | D |
| | 13 | Comparative Example 3 | 1 | D | B |

According to the present disclosure, the processing fluid prevents deterioration of the quality an image on a recording medium due to unification of an aqueous ink on the recording medium and improves abrasion resistance of the image in image forming using the aqueous ink.

Having now fully described embodiments of the present invention, it will be apparent to one of ordinary skill in the art that many changes and modifications can be made thereto without departing from the spirit and scope of embodiments of the invention as set forth herein.

What is claimed is:

1. A processing fluid for image forming by an aqueous ink, the processing fluid comprising:
   a flocculant configured to aggregate a colorant in the aqueous ink;
   a water-soluble organic solvent;
   a polymer particle; and
   water,
   wherein the polymer particle has a core-shell structure with a core portion including a wax and a shell portion having a lower critical solution temperature of 30 degrees C. or higher.

2. The processing fluid according to claim 1, wherein the shell portion has a lower critical solution temperature of from 40 to 80 degrees C.

3. The processing fluid according to claim 1, wherein the flocculant includes a water-soluble cationic polymer.

4. The processing fluid according to claim 3, wherein the water-soluble cationic polymer has a quaternary ammonium cation in a main chain of the water-soluble cationic polymer.

5. The processing fluid according to claim 4, wherein the water-soluble cationic polymer includes a repeating unit represented by the following chemical formula 1

Chemical formula 1

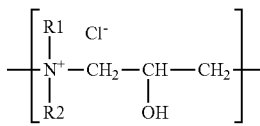

where R1 and R2 each, independently represent alkyl groups having 1 to 8 carbon atoms, hydroxyalkyl groups having 1 to 8 carbon atoms, alkenyl groups having 2 to 8 carbon atoms, or benzyl groups.

6. An image forming method comprising:
applying the processing fluid of claim 1 to a recording medium;
discharging an aqueous ink to the recording medium by an inkjet method to form an image on the recording medium; and
drying the recording medium on which the image is formed by heat.

7. The image forming method according to claim 6, wherein the recording medium has a coated layer on at least one surface of a substrate of the recording medium.

8. Recorded matter comprising:
a recording medium; and
an image recorded on the recording medium by the image forming method of claim 6.

9. An inkjet recording device comprising:
the processing fluid of claim 1;
a conveyance unit to convey a recording medium in a conveyance direction;
a processing fluid applying device configured to apply the processing fluid to the recording medium;
an image forming device configured to discharge the aqueous ink to the recording medium by an inkjet method to form an image on the recording medium; and
a drier disposed downstream in the conveyance direction from the image forming device, to heat the recording medium bearing the image formed by the image forming device.

* * * * *